June 13, 1933. C. E. WITTE 1,913,823
ANIMAL TRAP
Filed June 24, 1932 2 Sheets-Sheet 1

CLARENCE E. WITTE. Inventor

By *Herbert E. Smith*
Attorney

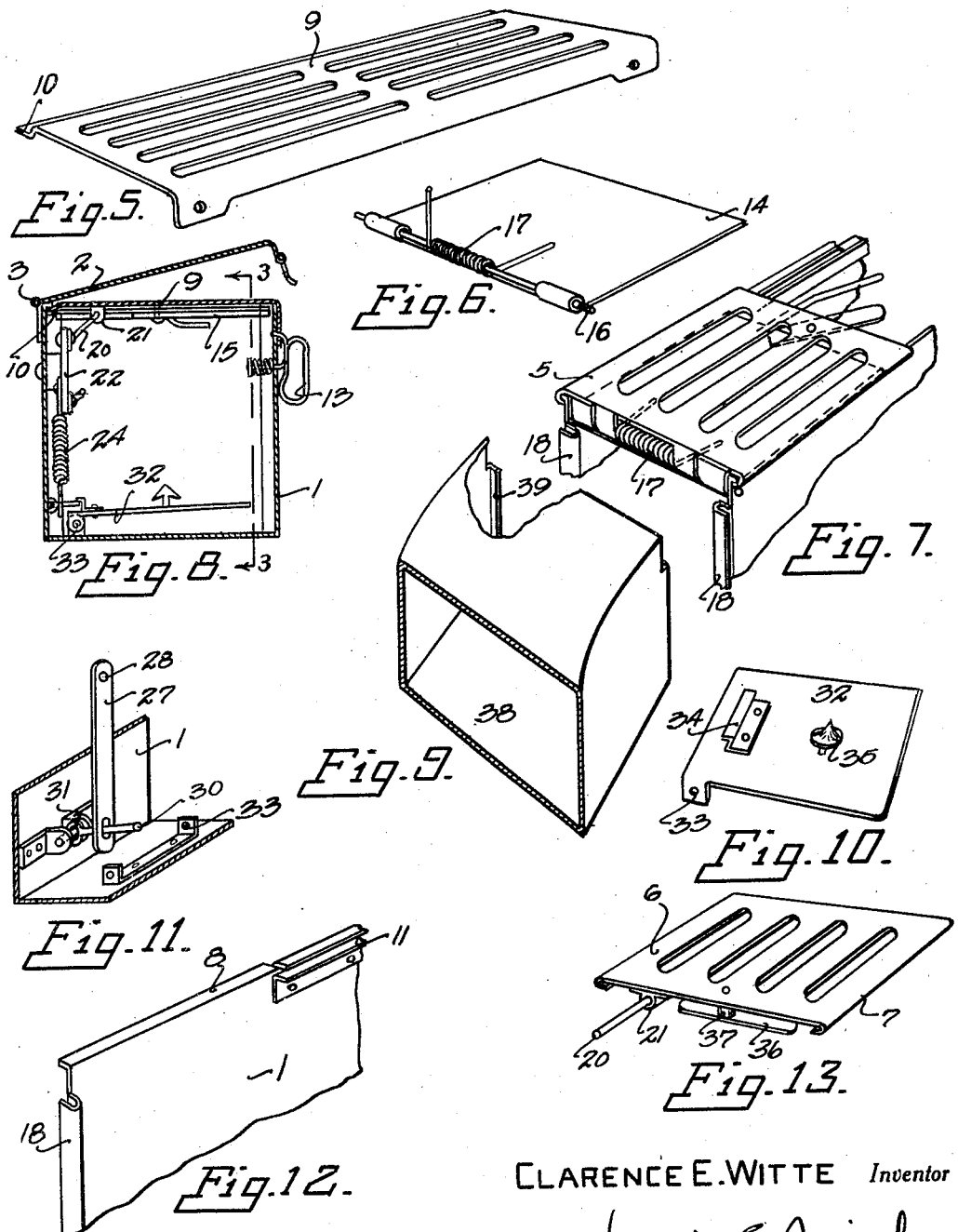

Patented June 13, 1933

1,913,823

UNITED STATES PATENT OFFICE

CLARENCE E. WITTE, OF THORNTON, WASHINGTON

ANIMAL TRAP

Application filed June 24, 1932. Serial No. 619,039.

My present invention relates to improvements in animal traps of the imprisoning, victim closed, tiltable platform, trigger released, and manually set type, designed especially for trapping alive and without harming, fur bearing animals, rodents, and other animals. The trap is adapted for use either at the entrance to or the exit from an animal burrow in the ground, or it may be placed at other locations in the path of the animal, and provided with a bait for enticing the animal into the trap.

Duplex, hinged trap-doors are provided at the opposite ends of a box, and pivoted slide bolts are provided for holding open the doors together with means actuated by the victim for releasing the doors to swing to closed position for trapping the animal. The invention consists in certain novel combinations and arrangements of parts for setting and operating the trap, as will be hereinafter more fully set forth and claimed.

In the accompanying drawings I have illustrated one complete example of the physical embodiment of my invention wherein the parts are combined and arranged according to the best mode I have thus far devised for the practical application of the principles of my invention.

Figure 5 is a perspective view of the main or central grid of the trap, detached.

Figure 6 is a perspective view of one of the duplex, spring doors.

Figure 7 is a perspective view showing a portion of the box, one of the end grids, and one of the trap doors in open position.

Figure 8 is a transverse vertical sectional view of the trap with the doors closed, and the lid partly open.

Figure 9 is a perspective view, partly broken away for illustration, of an end hood or extension of the trap employed at the entrance to or exit from a burrow.

Figure 10 is a perspective view of the depressible or tiltable plate for releasing the retaining means for the trap doors.

Figure 11 is a sectional detail view at line 11—11 of Figure 4 showing the trip link and connections.

Figure 12 is a perspective view showing a portion of one of the side walls of the box with fastening flanges thereon for co-action with the central grid and the detachable hood or extension.

Figure 13 is a perspective view of one of the detachable, slide grids, one of which is located at each end of the top of the box.

Figure 1:
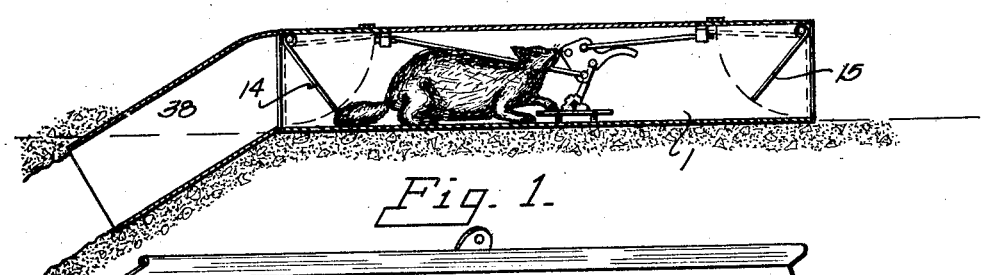
Figure 1 is a longitudinal sectional view of the trap, with the victim therein, and showing the duplex doors in the act of closing.
Figure 2:
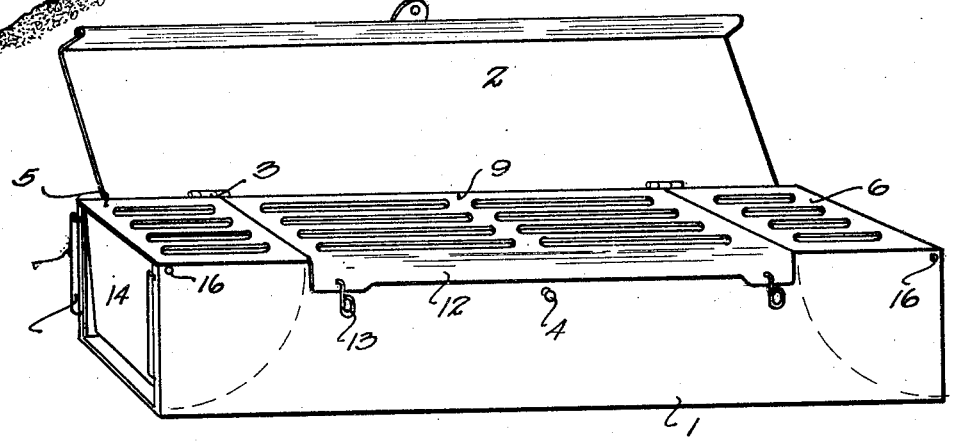
Figure 2 is a perspective view of the trap, with a hinged inspection door or lid opened, and the trap doors closed.

In carrying out my invention I preferably employ an elongated rectangular shaped box 1 of metal or other suitable material, open at both ends, and the top, and provided with a lid 2 that is hinged at the top of one side of the box at 3, and provided with a suitable fastener 4.

The top of the box, near its opposite ends, is provided with a pair of short grids 5 and 6, each of which is fashioned with edge flanges 7 that form grooves slidable over the complementary exterior flanges 8 at the top edges of the box, and these grids may be slid into place, from opposite ends of the box to form a closure that is ventilated, but is an effective barrier against escape of the victim.

Between these two end grids, a longer, central grid 9 is placed on the top of the box, and one edge of this grid is fashioned with an offset flange 10 that may be slipped easily into the groove 11 formed by the use of spaced flanges along the central portion and top edge of one of the walls of the box. Opposite to the offset flange 10 the grid is provided with an overlapping or overhanging flange 12 which fits over the top edge of the box along its central portion, and a suitable fastening device 13 is provided for securing this central grid in place.

The end grids and the intermediate grid cover the top of the open box, and the hinged lid 2 closes over the top of the grids, to prevent entrance of dirt, leaves, or débris, when the trap is set and located in position for use.

Figure 3:
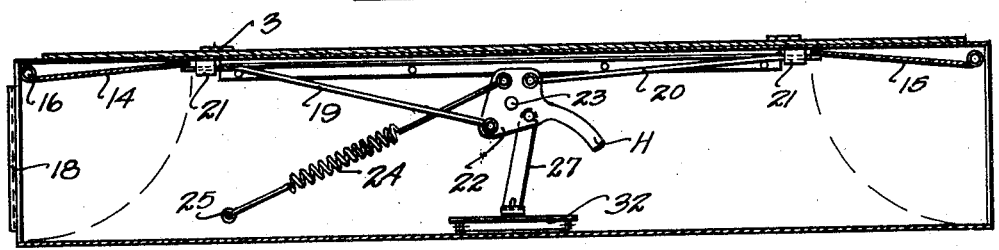
Figure 3 is a sectional view of the trap, set for operation.
Figure 4:
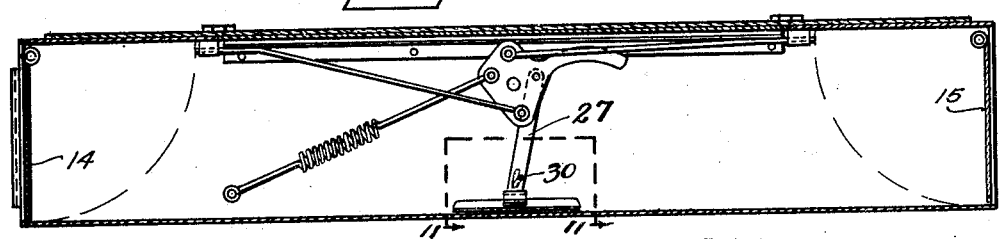
Figure 4 is a sectional view of the trap, with the doors closed.

The trap box may be entered from either end, and the ends of the box are provided with duplex trap doors 14 and 15 that are hinged at 16 under the end grids 5 and 6, that is, the doors are hinged to the under faces of these grids, and coiled springs 17 are used on the hinge pins with their ends between the doors and the grids, when the hinges or springs are under compression with the doors open. When open, the doors, as shown in Figure 3 are retained against the under sides of the end grids, and out of the path of the victim, which may enter the trap through either end.

The trap doors are swung upwardly, and set, against tension of their springs, and they swing closed, when released, under action of gravity, aided by their springs, and of course the doors are snapped, quickly to closed position, in front of and at the rear of the imprisoned victim, and suitable means may be provided to stop the doors in closed position, as for instance, vertical flanges 18 at the ends of the box which project inwardly from opposite sides thereof.

When open, and set, the trap doors are retained, each by a slide bolt, as 19 and 20, which extend longitudinally of the box at one side of and near the top, and these slide bolts reciprocate in bearings as 22 fixed at the undersides of the respective end grids 5 and 6. The bolts are of considerable length with their outer free ends adapted to slide under the free edges of the opened trap doors, and the inner ends of the bolts, near the longitudinal center of the box are pivotally connected with a vertically disposed rock-plate 22 which is pivoted at 23 at the inner side of one of the side walls of the box. The inner ends of the slide bolts are pivoted at diametrically opposite points with relation to the pivot center 23 of the rock plate, and the plate is rocked to project the bolts to set position, after which a spring 24, pivoted to the plate and anchored at 25 to the side wall of the box, rocks the plate in the opposite direction to release the trap doors. The spring 24 is placed under tension when the slide bolts are projected to set position beneath the upturned trap doors, and the plate is rocked against the tension of the spring by the use of a finger pressed against the handle H of the rock plate. When the rock plate is released, the bolt-spring 24 quickly, with a snap-action, turns the plate to release the free ends of the bolts from under their respective trap doors.

From the rock plate a depending link 27 is suspended and pivoted to the plate at 28, and the lower free end of this vertical link is fashioned with a slot 29 through which a detent-pin 30 projects, the pin being pivoted or hinged at 31 at the inner side of one of the walls of the box. In connection with the detent-pin I utilize a depressible plate or platform 32 located at the approximate center of the trap-box and slightly elevated by its hinge connection 33 from the bottom of the box. Near the hinged edge of the depressible platform a flange 34 is secured to the top of the platform and forms a trip to slip over the top of the free end of the detent-pin 30, and a bait-holder 35 is secured at the approximate center of the depressible platform for the reception and retention of a suitable bait for the victim.

To facilitate the setting of the trap, which includes the two trap-doors, I employ a temporary, rotary latch 36 for each door, the latches being pivoted at 37 at the under side of and near the inner end of each end-grip 5 and 6. Thus, as a temporary expedient, before setting the trap, the two doors are swung up to open position, and then the rotary latch is turned with an end beneath the free edge of the spring-door, to hold the doors until the trap is set. After the trap has been set, these two latches are turned to inactive position, out of the way of the trap doors.

With the two doors temporarily held in open position, the handle H is turned by finger pressure to project the slide bolts beneath the free edges of the doors, against the tension of the spring 24 as the plate 22 is rocked or turned on its pivot 23. The turning of the plate lifts the slotted link 27, and also the hinged detent-pin, slightly. While the pin is uplifted, the trip 34 is slipped over the end of the pin, the depressible platform being slightly raised to permit this connection, and the frictional engagement between the detent-pin and the trip is sufficient to hold the depressible platform uplifted and also hold the link down. As soon as the victim places his fore feet, or a fore foot on the depressible platform, the weight is sufficient to depress the platform, release the trip and detent-pin, and then the spring 24 is free to contract, swing the rock plate, and thus withdraw the slide bolts from the trap-doors. The released trap doors are then swung to closed position, imprisoning the victim, by closing both ends of the trap.

In some instances the trap is set at the entrance, or at the exit of a burrow in the earth, to trap the animal, and under these conditions I utilize a detachable hood or extension of the box, which is designated 38. The hood is provided with attaching flanges 39 that project inwardly from opposite sides, and these flanges slide down in the grooved flanges 18 of the trap-box. The hood is of angular shape in order that the trap may rest in horizontal position on the surface of the ground, and the hood is then inserted in the mouth of the burrow, as indicated in Figure 1, where the animal is shown as being trapped in an endeavor to ascend from the subterranean burrow.

After the animal has been caught, the lid 2 may be opened, and the animal inspected through the perforated parts or grids forming the top of the trap-box, and these parts may be removed, or the central grid may be removed, to gain access to the animal for removal.

Having thus fully described my invention, what I claim as new and desire to secure by Letters Patent is:

1. In an animal trap the combination with a pair of spring actuated doors having hinges in the upper portions of the open ends of the box and adapted to lie in approximately horizontal, open, position, of a vertically disposed rock-plate pivoted within the box on one side thereof, a pair of oppositely arranged, horizontally disposed slide-bolts pivoted on the rock-plate and guides for said bolts, the free ends of the bolts fitting beneath the free edges of the open doors, a depressible trip device located on the bottom of the box and actuated by weight of the victim to release said plate, and a spring connecting the bottom of the trap and the rock plate for rocking the latter.

2. In an animal trap, the combination with a pair of spring-actuated, hinged doors, and a temporary rotatable latch for each door, of a rock plate pivoted within the box on one side thereof, a slide bolt for each door pivotally connected to the plate with its free end adapted to support the free edge of an open door, guides for the respective slide bolts, a setting handle on said plate, a spring anchored to the trap and to said rock plate for turning said plate, a link pivotally suspended from the plate and having a slot at its lower free end, a pin hinged to the side of the trap with its free end projecting through said slot, a depressible platform hinged at the bottom of the trap, and a friction trip on said platform overlapping the free end of the pin.

In testimony whereof I affix my signature.

CLARENCE E. WITTE.